United States Patent
Thimm et al.

(10) Patent No.: US 7,501,791 B2
(45) Date of Patent: Mar. 10, 2009

(54) SYSTEM FOR THE COORDINATION OF AT LEAST ONE SWITCHABLE VEHICLE FUNCTION OF A MOTOR VEHICLE

(75) Inventors: Kornelius Thimm, Munich (DE); Anton Schumann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/882,071

(22) Filed: Jul. 30, 2007

(65) Prior Publication Data

US 2008/0007205 A1  Jan. 10, 2008

Related U.S. Application Data

(63) Continuation of application No. PCT/EP2005/012931, filed on Dec. 2, 2005.

(30) Foreign Application Priority Data

Jan. 28, 2005  (DE) ................ 10 2005 003 979

(51) Int. Cl.
  *H02J 7/00* (2006.01)
  *B60K 1/00* (2006.01)
  *B60K 6/00* (2007.10)
  *B60K 8/00* (2006.01)
  *B60K 16/00* (2006.01)

(52) U.S. Cl. ............... 320/104; 903/902; 903/903; 903/904; 903/905; 903/906; 903/907; 180/65.1; 180/65.2; 180/65.3; 180/65.4

(58) Field of Classification Search ........ 903/902–907; 180/65.1–65.4; 320/104

See application file for complete search history.

(56) References Cited

U.S. PATENT DOCUMENTS 6,202,776 B1  3/2001  Masberg et al.
6,526,931 B1  3/2003  Vilou (Continued)

FOREIGN PATENT DOCUMENTS

DE  195 32 135 A1  3/1997

(Continued)

OTHER PUBLICATIONS

German Office Action dated Jul. 11, 2005 w/English translation (four (4) pages).

(Continued)

*Primary Examiner*—Akm E Ullah
*Assistant Examiner*—Jue Zhang
(74) *Attorney, Agent, or Firm*—Crowell & Moring LLP

(57) ABSTRACT

A system is provided for the coordination of at least one switchable vehicle function of a motor vehicle, at least one battery charge condition threshold value of the energy accumulator unit being assigned to the at least one vehicle function such that, when there is an exceeding of or falling below the battery charge condition threshold value, the assigned vehicle function can be activated. Different battery charge condition threshold values can be assigned to the at least one vehicle function as a function of the operating condition of the drive unit, the temperature of the energy accumulator, the temperature outside the vehicle, and/or the age condition of the energy accumulator unit.

3 Claims, 2 Drawing Sheets

U.S. PATENT DOCUMENTS 6,532,926 B1 * 3/2003 Kuroda et al. ................ 903/903
2002/0157882 A1 * 10/2002 Kubo et al. ................ 180/65.3
2003/0132730 A1 7/2003 Ochial

FOREIGN PATENT DOCUMENTS

| | | |
|---|---|---|
| DE | 100 38 280 A1 | 3/2001 |
| EP | 1 333 174 A1 | 8/2003 |
| JP | 6-48189 A | 2/1994 |
| JP | 10-325346 A | 12/1998 |
| JP | 2001-304008 A | 10/2001 |

OTHER PUBLICATIONS

International Search Report dated Mar. 3, 2006 w/English translation (six (6) pages).

* cited by examiner

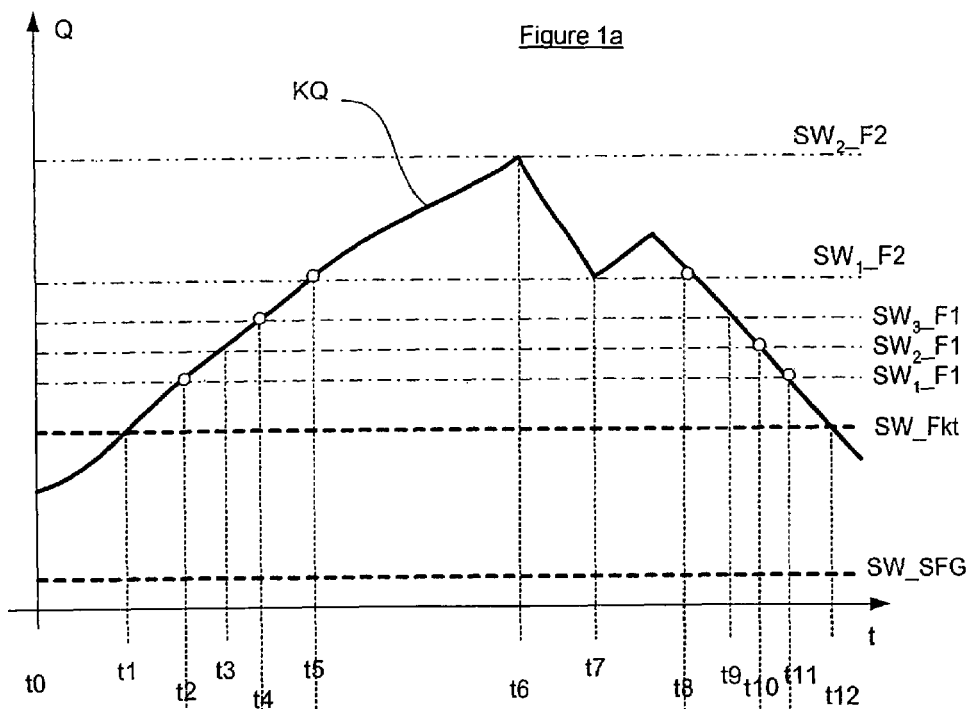
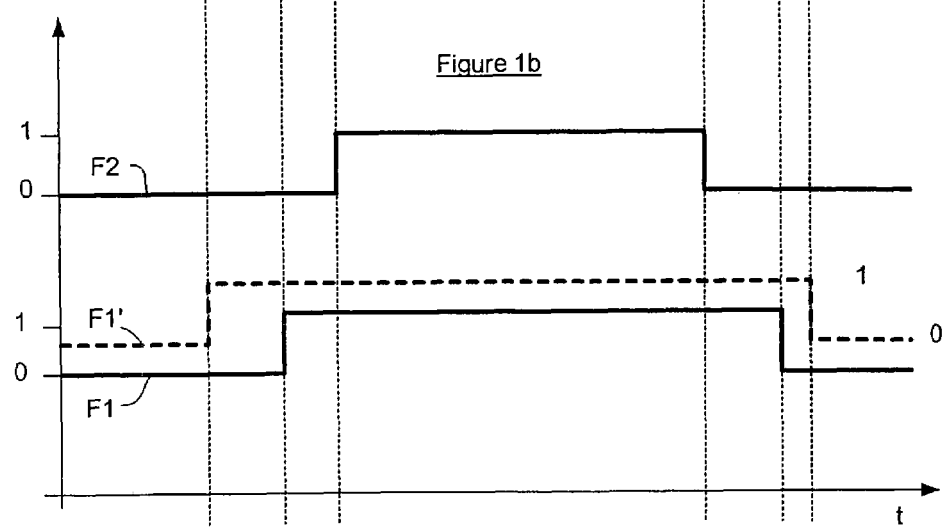

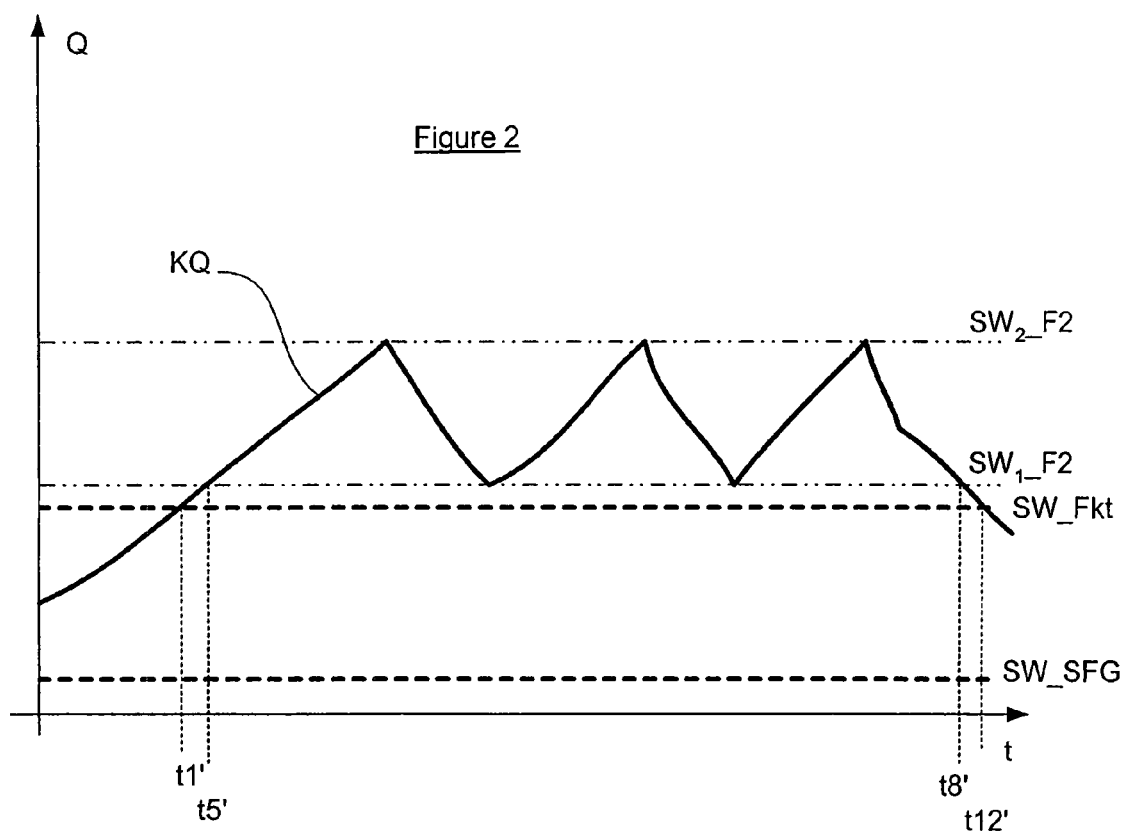

SYSTEM FOR THE COORDINATION OF AT LEAST ONE SWITCHABLE VEHICLE FUNCTION OF A MOTOR VEHICLE

CROSS-REFERENCE TO RELATED APPLICATIONS

This application is a continuation of PCT International Application No. PCT/EP2005/012931, filed Dec. 2, 2005, which claims priority under 35 U.S.C. §119 to German Application No. 10 2005 003 979.0, filed Jan. 28, 2005, the entire disclosures of which are expressly incorporated by reference herein.

BACKGROUND AND SUMMARY OF THE INVENTION

The invention relates to a system for the coordination of at least one vehicle function of a motor vehicle, which vehicle function is further developed such that it can be activated and deactivated (in the following called a "switchable vehicle function").

Vehicles having an integrated, automatic engine stop-start function are known, where, as a function of existing first vehicle operating conditions (for example, triggered by a vehicle speed below a defined speed limit and the operation of the clutch pedal and/or brake pedal) an engine stop function is automatically initiated, by which the internal-combustion engine is switched-off and, where, when second vehicle operating conditions are present (based on an active engine stop function—for example, triggered by the simultaneous operation of the brake pedal and the gas pedal), the internal-combustion engine is automatically started by the automatic engine start function. Such an automatic engine stop-start function, as a possible switchable vehicle function in the sense of the invention, as a rule, is only switched active when the battery charge condition is a predefined minimum battery charge condition.

It is an object of the invention to provide a system for the coordination of at least one switchable vehicle function, which ensures a further reduction of the fuel consumption and, particularly, a further reduction of the emissions generated during the vehicle operation.

According to the invention, a system is provided for the coordination of at least one vehicle function of a motor vehicle, which vehicle function is further developed such that it can be activated and deactivated. A motor vehicle includes a drive unit constructed particularly as an internal-combustion engine, and an electric energy accumulator unit constructed particularly as a battery, wherein at least one battery charge condition threshold value of the energy accumulator unit is assigned to the at least one vehicle function such that, on exceeding or falling below the battery charge condition threshold value, the assigned vehicle function can be activated. Different battery charge condition threshold values can be assigned to the at least one vehicle function as a function of the operating condition of the drive unit, the temperature of the energy accumulator, the temperature outside the vehicle, and/or the age condition of the energy accumulator unit.

As a result of the fact that different battery charge condition threshold values can be assigned to the at least one switchable vehicle function as a function of the operating condition of the drive unit, and/or as a function of the temperature of the energy accumulator, and/or as a function of the temperature outside the vehicle, and/or as a function of the age condition of the energy accumulator unit, a best-possible use of the electric energy resources can be achieved for any operating mode of the vehicle (or for any operating mode of its drive unit) with the present invention.

Different operating modes (operating conditions of the drive unit), in which different battery charge condition threshold values are assigned to the at least one switchable function for its activability, are preferred: operation with a pollutant emission that is as low as possible, operation with a drive power (also called boosting operation) that is as high as possible, or an operation with a drive comfort that is as high as possible. Depending on the selected operation, which can be manually defined by the driver or can be set automatically on the basis of the vehicle handling detected over a predefined time period, different battery charge condition threshold values are assigned to one and the same switchable function, in which case the respective function can be activated only when these threshold values are exceeded (or reached). In this case, it is unimportant whether these are functions which can be demanded (switched-on) manually by the driver or whether they are functions which are demanded automatically because of existing operating conditions.

In a preferred embodiment of the invention, at least one automatic engine stop-start function is provided for the coordination.

At any rate, in a further development of the invention, the respective battery charge condition threshold value of the function can be further developed to be variable independently of the type of the switchable function to be coordinated. The battery charge condition threshold values can preferably be varied as a function of whether a switchable function can be switched on or cannot be switched on within a predefined time period, and/or whether a switchable active function is probably switched off within a predefined time period.

Other objects, advantages and novel features of the present invention will become apparent from the following detailed description of the invention when considered in conjunction with the accompanying drawings.

BRIEF DESCRIPTION OF THE DRAWINGS

FIG. 1a is a diagram schematically illustrating the battery charge condition over time;

FIG. 1b is a condition diagram illustrating the time periods of the activability of switchable functions as a function of the charge condition of the energy accumulator (FIG. 1a); and FIG. 2 is a diagram according to FIG. 1a, in which a switchable function can probably not be activated for a predetermined time duration.

DETAILED DESCRIPTION OF THE DRAWINGS

FIG. 1a is a condition diagram in which the condition Q of the electric energy accumulator unit—for example, constructed as a battery—is shown as course KQ over time t. This diagram also shows battery charge condition thresholds $SW_{x\_}F1, SW_{x\_}F2, \ldots, SW_{x\_}Fn$ (or battery charge condition threshold values), which are assigned to individual switchable functions $F1, \ldots, Fn$ (in the following also simply called functions $F1, \ldots, Fn$) that are to be coordinated. In this case, the individual battery charge condition thresholds $SW_{x\_}F1, SW_{x\_}F2, \ldots, SW_{x\_}Fn$ assigned to the functions $F1, \ldots, Fn$ define at which batter charges states the individual functions $F1, \ldots, Fn$ can be first activated at all. In battery charge states below these battery charge condition threshold values $SW_{x\_}F1, SW_{x\_}F2, \ldots, SW_{x\_}Fn$, the functions $F1, \ldots, Fn$ assigned to these battery charge condition threshold values $SW_{x\_}F1, SW_{x\_}F2, \ldots, SW_{x\_}Fn$ cannot be activated. The battery charge condition thresholds $SW_x\_F1, SW_x\_F2, \ldots, SW_x\_Fn$ assigned to the individual functions $F1, \ldots, Fn$ are preferably stored in data memories in table form.

The coordination of the switchable functions $F1, \ldots, Fn$ or the controlling of actuators, which is connected therewith, takes place by control signals of a control unit. The control signals are generated as a function of the actual battery charge condition of the accumulator unit and as a function of the battery charge condition threshold values $SW_x\_F1, SW_x\_F2, \ldots, SW_x\_Fn$ assigned to the individual functions $F1, \ldots, Fn$ and as a function of demand signals for certain functions
$F1, \ldots, Fn$ generated manually by the driver or automatically by driver assistant systems or other automatic functions.

In FIGS. 1a and 1b, the method of operation of the invention will be explained by the example of two differently switchable functions F1 and F2. Here, F1 is, for example, the switchable automatic engine stop-start function. Based on a battery charge condition Q(t0) at the point in time t0, which is below the two battery charge condition thresholds $SW_x\_F1$ and $SW_x\_F2$ assigned to the functions F1 and F2, none of the functions $F1, \ldots, Fn$ can therefore be activated at this point in time (time period between t0 and t1).

In the further course KQ of the charge condition of the battery, the latter is further charged by way of the vehicle generator. At the point in time t2, the charge condition of the battery exceeds a first battery charge condition threshold $SW_1\_F1$, starting at which the automatic engine stop-start functionality (within the time period t2 and t1) could theoretically be permitted (see FIG. 1b: dotted signal form F1). Preferably, the activability of the automatic engine stop-start function is implemented not by means of only one battery charge condition threshold but by means of at least two, in the present case, even three battery charge condition thresholds. Since, immediately before the point in time t2, the charge condition of the battery was still below this threshold (thus sufficient battery charge is not available), during the first exceeding of this threshold within an operating cycle (ignition ON—ignition OFF), the functionality is not yet released (at this point in time, the switchable function cannot be activated). The (first-time) function release (ensuring the activability of a switchable function) preferably takes place only in the case of a first-time exceeding (or reaching) of an increased or upper battery charge condition threshold (here: $SW_3\_F1$, third battery charge condition threshold of the function 1 at the point of time t4) or in the event that, after a start of the operation, there had been a falling below the lower battery charge condition threshold $SW_1\_F1$ and subsequently the upper battery charge condition threshold $SW_3\_F1$ was exceeded again. Thus, starting at the point in time t4, the automatic engine stop-start function can be activated when the corresponding demand conditions are present (for example, engine stop at $v<=v_{min}$ and the brake pedal is operated). When there is a falling below the medium battery charge condition threshold $SW_2\_F1$ at the point in time t10, the automatic engine stop-start functionality is at least partially suppressed again so that, even in the presence of a demand condition for an automatic engine stop, the latter would not be initiated (FIG. 1b: solid-line signal form F1).

An automatic engine start is necessarily carried out only when there is a falling below the lower battery charge condition threshold $SW_1\_F1$ if an active engine stop is present. If, starting from a battery charge condition above the medium battery charge condition threshold $SW_2\_F1$ (automatic engine start-stop function can be activated), there is a falling below the latter, in the battery charge condition between the lower battery charge condition threshold $SW_1\_F1$ and the medium battery charge condition threshold $SW_2\_F1$, no automatic switching-off (in the sense of the automatic engine stop-start) of the internal-combustion engine is permitted when engine stop conditions are present. However, when there is a falling below the medium battery charge condition threshold $SW_2\_F1$, there is still no forced start of the internal-combustion engine independently of the presence of possible engine starting conditions—but a forced start takes place only when there is a falling below the lowest battery charge condition threshold value $SW_1\_F1$ at the point in time t11.

In the illustrated embodiment, two additional battery charge condition thresholds $SW_1\_F2$ (first/lower battery charge condition threshold of function 2) and $SW_2\_F2$ (second/upper battery charge condition threshold of function 2) assigned to another switchable function F2 are present. Starting at the point in time of the exceeding of the lower battery charge condition threshold $SW_1\_F2$ at the point in time t5 until the point in time t8, at which there is a falling below this battery charge condition threshold $SW_1\_F2$, function F2, which is assigned to this battery charge condition threshold, is active or can be activated—when the corresponding demand conditions are present, if they are required. For example, starting with the exceeding of the battery charge condition threshold $SW_1\_F2$, an active intelligent automatic generator control can be activated, which relieves the generator by the controlled discharge of the energy accumulator unit. The controlled discharge takes place, for example, such that consuming devices which, during an operation without an intelligent generator control, are supplied by the generator, are now supplied at least proportionally or temporarily by the energy accumulator unit.

In addition to the battery charge condition thresholds $SW_x\_F1, SW_x\_F2, \ldots, SW_x\_Fn$ assigned to the switchable functions $F1, \ldots, Fn$, two additional battery charge condition thresholds exist in the present example. These are a battery charge condition threshold SW_SFG defining the starting capacity limit (minimum charge quantity of the battery in order to be able to ensure a start of the internal-combustion engine), and a battery charge condition threshold SW_Fkt, starting at which switchable functions can be activated at all. When there is a falling below the starting capacity limit, an operation automatically takes place during which the electric energy accumulator is charged by the generator, preferably by way of a maximal charging capacity.

FIG. 2 shows the condition diagram according to FIG. 1, wherein it is assumed that the first function F1 is not activated for a predefined minimum time period. This may, for example, be the case if it should not be possible to activate function F1 further developed as an automatic engine stop-start system, because an air-conditioning operation is switched active. In the event that, because of predefined conditions, a switchable function can probably not be activated for at least a predefined time period, the battery charge condition thresholds $SW_x\_F2, \ldots, SW_x\_Fn$ of the remaining switchable functions are automatically newly assigned or computed. In the present example, considerably lower battery charge condition threshold values had been assigned to the battery charge condition thresholds $SW_1\_F2$ and $SW_2\_F2$. Because of the probable non-existence of function F1, function F2 can therefore already be switched to be activated or to be activatable at lower charge conditions of the battery (F2 active or activatable between points in time t5' and t8').

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle system for coordinating at least one vehicle function that is activatable and deactivatable, the motor vehicle system comprising:
   a drive unit;
   an electric energy accumulator unit; and
   at least one battery charge condition threshold value of the energy accumulator unit being assigned to the at least one vehicle function of the motor vehicle, such that on exceeding or falling below a given battery charge condition threshold value, the assigned vehicle function becomes activatable; and
   wherein different battery charge condition threshold values are assignable to the at least one vehicle function as a function of at least one of an operating condition of the drive unit, a temperature of the energy accumulator unit, a temperature outside of the vehicle, and an age condition of the energy accumulator unit,
   wherein the at least one vehicle function includes an automatic engine stop-start function,
   wherein at least three battery charge condition threshold values are assigned to the automatic engine stop-start function, such that:
      in an event of a start of the operation of the motor vehicle and in an event that, during an operating cycle a falling below of the lowest battery charge condition threshold value occurs, the vehicle function can be activated only when a battery charge condition above the top battery charge condition threshold value is present; and
      in an event that the top battery charge condition threshold value was exceeded once within an operating cycle and subsequently there was a falling below the top battery charge condition threshold value and there was no falling below the lowest battery charge condition threshold value, the vehicle function can already be activated when the battery charge condition is greater than or equal to the medium battery charge condition threshold value.

2. The system according to claim 1, wherein the drive unit is an internal-combustion engine and the energy accumulator unit is a battery.

3. The system according to claim 1, wherein the battery charge condition threshold values are variable such that at least one of the following occurs:
   in an event that a vehicle function is not activatable for a predefined time period, the battery charge condition threshold value of at least one other vehicle function is reduced; and
   in an event that a vehicle function is connected within a predefined time period, the battery charge condition threshold value of at least one additional vehicle function is increased.

\* \* \* \* \*